United States Patent
Shih et al.

(10) Patent No.: US 7,653,041 B2
(45) Date of Patent: Jan. 26, 2010

(54) METHOD FOR POWER-EFFICIENT TRANSMISSION SUPPORTING INTEGRATED SERVICES OVER WIRELESS LOCAL AREA NETWORK

(75) Inventors: Chih-Yung Shih, Taipei (TW);
 Ray-Guang Cheng, Keelung (TW);
 Chung-Ju Chang, Taipei (TW);
 Yih-Shen Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 308 days.

(21) Appl. No.: 11/128,794

(22) Filed: May 12, 2005

(65) Prior Publication Data
US 2006/0256765 A1 Nov. 16, 2006

(51) Int. Cl.
 *H04W 4/00* (2009.01)
 *H04W 72/00* (2009.01)
 *H04J 3/16* (2006.01)
 *H04J 3/24* (2006.01)
 *H04B 7/212* (2006.01)

(52) U.S. Cl. .............. 370/346; 370/338; 370/347; 370/348; 370/349

(58) Field of Classification Search ......... 370/346–349, 370/338; 455/450, 451
See application file for complete search history.

(56) References Cited

U.S. PATENT DOCUMENTS

| | | | | |
|---|---|---|---|---|
| 5,421,030 A | * | 5/1995 | Baran | 725/106 |
| 5,758,278 A | * | 5/1998 | Lansdowne | 455/343.4 |
| 6,172,971 B1 | * | 1/2001 | Kim | 370/348 |
| 6,542,495 B1 | * | 4/2003 | Sugita | 370/347 |
| 6,545,999 B1 | * | 4/2003 | Sugita | 370/347 |
| 6,704,302 B2 | * | 3/2004 | Einbinder et al. | 370/352 |
| 2002/0154653 A1 | * | 10/2002 | Benveniste | 370/447 |
| 2004/0081133 A1 | * | 4/2004 | Smavatkul et al. | 370/346 |
| 2005/0047357 A1 | * | 3/2005 | Benveniste | 370/311 |
| 2005/0135409 A1 | * | 6/2005 | Janczak | 370/449 |

* cited by examiner

*Primary Examiner*—Vincent P Harper
*Assistant Examiner*—Ariel Balaoing
(74) *Attorney, Agent, or Firm*—Bucknam and Archer

(57) ABSTRACT

This invention provides a method for power-efficient transmission supporting integrated service over WLAN. The said invention combines the polling-based and the contention-based mechanisms, named on-demand polling (ODP). In the ODP scheme, a voice station is in the polling list when it is in the active mode. During the idle mode, it is configured to operate in the sleep mode for saving power. Also, it adopts the contention-based mechanism to join the list again while returning from the idle mode. On the other hand, the data station adopts the contention-based mechanism to transmit its packets over WLAN. In addition, to achieve service differentiation, the said invention also employs a prioritized access probability for voice over data services. Simulation results show that the said invention can reduce the power consumption for voice stations and enhance the throughput for data stations.

8 Claims, 3 Drawing Sheets

METHOD FOR POWER-EFFICIENT TRANSMISSION SUPPORTING INTEGRATED SERVICES OVER WIRELESS LOCAL AREA NETWORK

BACKGROUND OF THE INVENTION

1. Field of the Invention

This invention relates to a method for supporting integrated service over WLAN (wireless local area network), and more specifically, to a method for power-efficient transmission supporting integrated service over WLAN, which can reduce the power consumption for voice stations and enhance the throughput for data stations.

2. Discussion of Related Art

The integration of WLANs and 3G networks has recently evolved into a very hot topic. The service continuity is one of the issues needed to be resolved for the 3G/WLAN heterogeneous networks. In order to provide service continuity, it is essential for WLAN to support voice services. To support integrated voice and data services over WLAN, the WLAN has to support differentiated quality of services (QoSs) to guarantee the requirements of voice users. In addition to provide the differentiated QoS, the 3G/WLAN voice-enabled device needs to increase its stand-by time by reducing power consumption. Existing WLAN card may operate in either of two operation modes. In the active mode, all of the RF and based band chipsets are turning on and the power consumption is the highest. In the sleep mode, most of the functions are disabled and the power consumption could be minimized.

In order to support differentiated QoSs, the task group E of the IEEE 802.11 standardizes the MAC enhancements for WLANs, denoted as 802.11e. The IEEE 802.11e defines a hybrid coordination function (HCF) which supports a contention-based and a polling-based channel accesses. The enhanced DCF (EDCF) is the contention-based channel access, which allows the QoS access point (QAP) to exchange frames with QoS stations (QSTAs) based on CSMA/CA mechanism. The HCF controlled channel access adopts a polling-based mechanism, which allows the QAP to enable the contention-free frame exchange with the QSTAs during a contention period. Several papers such as "Voice and Data Transmission over an 802.11 Wireless Network", M. A. Visser and M. E. Zarki, IEEE PIMRC, September 1995; "Investigate of IEEE 802.11 Medium Access Control (MAC) Sublayer Functions", B. P. Crow, I. Widjaja, J. G. Kim, P. Sakai, IEEE INFOCOM 1997, vol. 1, pp. 126-133, 1997; and "Support of Voice Services in IEEE 802.11 Wireless LANs", M. Veeraraghavan, N. Cocker, T. Moors, IEEE INFOCOM 2001, vol. pp. 488-497, 2001 have studied the performance of integrated voice and data services over WLANs. In these papers, the operations of WLANs are limited to a point coordinator function (PCF) and a distributed coordinator function (DCF), instead of the HCF. Moreover, a round-robin (RR) polling scheme was adopted to schedule the voice sources. It may cause power waste due to the excess polling of silent stations (STAs).

Further, U.S. Pat. No. 6,747,968, "Methods and Systems for Weighted PCF Polling Lists for WLAN QoS Support" has disclosed a weighted polling scheme considering the billing information, transmission duration and user profiles as a weighting function. However, the scheme is proposed for PCF mechanism only. U.S. Pat. No. 6,640,268 "Dynamic Polling Mechanism for Wireless Devices" has disclosed a dynamic polling scheme which adjusts the polling intervals according to the activity level of each polled device. However, the devices returning from the idle mode need to contend in the DCF mechanism to join the polling list, and whereby the polling waste occurs. U.S. Pat. No. 6,275,500, "Method and Apparatus for Dynamic Control of Talk Groups in a Wireless Network" has disclosed a method for dynamic control of talk groups. However, it only handles the communication between the talk groups and does not involve with the organization of the polling list. And U.S. Pat. No. 5,297,144, "Reservation-Based Polling Protocol for a Wireless Data Communications Network", has disclosed a polling method for non-contention-based wireless network. However, this method cannot be used in the contention-based transmission mode.

Therefore, it is necessary to develop a method capable of application of both the PCF and DCF mechanism for integrated voice and data services over WLAN to reduce the power consumption.

SUMMARY OF THE INVENTION

In view of the foregoing, it is an object of the invention to provide a method to transmit integrated services over WLAN so as to reduce the power consumption and enhance the system throughput.

In order to achieve the above object, according to this invention, there is provided with a method for power efficient transmission, named on-demand polling (ODP), which is used for integrated services over WLAN to dynamically adjust a polling list and combines the polling-based and contention-based mechanism to transmit real-time voice service and non-real-time data service, wherein voice packets are transmitted by the polling-based mechanism and data packets are transmitted by the contention-based mechanism.

In the ODP scheme, a voice station is in the polling list and adopts the polling-based mechanism to transmit voice packets when it is in the active mode. During the idle mode, the voice station is in a sleep mode to save power. On the other hand, a data station adopts the contention-based mechanism to transmit data packets.

Further, according to the present invention, differentiated transmission priority of the integrated services is adopted in the method for power-efficient transmission over WLAN, wherein the voice packets are sent by the higher priority.

As a result, the present invention can be applied to the hybrid contention-based and non-contention-based transmission. Since the method of the present invention only calculates the user's activity, the polling waste will be prevented. Moreover, this method differentiates the transmission priority of the integrated services, so that a transmission delay of voice service is guaranteed and the throughput of data service can be enhanced.

BRIEF DESCRIPTION OF THE DRAWINGS

The above and other objects and features of the present invention will become apparent from the following description of the preferred embodiment taken in conjunction with the accompanying drawings, in which.

DETAILED DESCRIPTION OF PREFERRED EMBODIMENTS

In the present invention, a power-efficient transmission method, named on-demand polling (ODP), is provided. The proposed ODP scheme is used for integrated services over WLAN, wherein the polling-based and contention-based mechanism is combined to transmit real-time voice service and non-real-time data service accordingly. In the following, a preferred embodiment of the invention applied to the IEEE 802.e will be described.

In the ODP scheme over 802.11e, non-real-time data services are only transmitted by contention-based EDCF. On the other hand, based on the ON/OFF property of voice model, voice packets are transmitted by polling-based HCF controlled channel access or EDCF under different conditions. After accepting a new voice call, the QAP (QoS Access Point) would add the QSTA (QoS station) into its polling list. Then, the QAP will periodically poll QSTAs according to the list and wait for transmission of uplink voice packets. In order to enhance transmission efficiency, the QSTAs entering the silence period will be removed from the polling list. When the QSTAs are initiating a talkspurt, they will use higher access priority in EDCF to send voice packets for joining the polling list.

Figure 1:
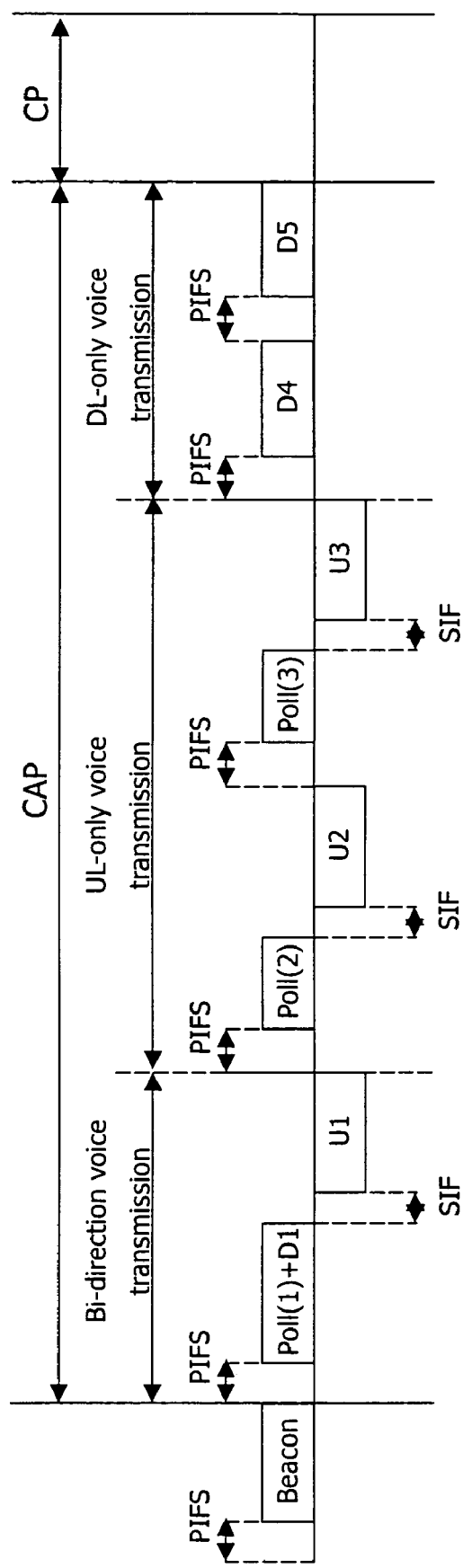
FIG. 1 shows an example of the timing diagram of the ODP scheme according to the present invention.

The period of a superframe in the ODP scheme is identical to the time interval of two successive voice packets generated by a QSTA. The superframe is divided into two periods: controlled access phase (CAP) and contention phase (CP) as shown in FIG. 1. In CAP, QAP polls QSTAs to get uplink voice packets or transmits downlink voice packets directly without acknowledge based on HCF controlled channel access. In CP, the voice QSTAs which are initiating a talkspurt and data QSTAs with packets in queue contend the channel based on EDCF with different priorities. The CAP within a superframe is further divided into three transmission periods: bi-direction voice transmission, uplink-only voice transmission (UL-only), and downlink-only voice transmission (DL-only). An active voice QSTA will be polled one of the three periods according to their current states.

For the bi-direction voice transmission period, the QAP combines the QoS(+)CF-Poll frame and the downlink voice packet into a single data frame by the QAP. After receiving the frame, the QSTA transmits an uplink voice frame to the QAP. For the UL-only voice transmission period, the QAP sends a sole QoS(+)CF-Poll frame to the QSTA and then waits for a uplink voice packet. For DL-only voice transmission period, the QAP consecutively sends remaining downlink voice packets without acknowledgement response from the corresponding QSTAs. Note that, during bi-direction voice transmission and UL-only voice transmission periods, the QSTA will be regarded as entering the silence period and removed from polling list if two consecutive QoS Null frames are received by QAP. After the CAP, the remaining time of a superframe is allocated for the CP, which is shared by EDCF.

Moreover, QAP should assign different AIFS (Arbitration Inter-Frame Space), minimum contention window size $CW_{min}$, and maximum contention window size $CW_{max}$ for voice and data stations. For the guarantee of access delay, the AIFS of a voice QSTA, $AIFS_{RT}$, is set to be PIFS (PCF Inter-Frame Space). And the $CW_{min}$, denoted as $CW_{min\_RT}$, and $CW_{max}$, denoted as $CW_{max\_RT}$, are given by $$CW_{min\_RT} = CW_{max\_RT} = \max(2, \lceil E[N_V] + 1 \rceil), \quad (1)$$

where $N_V$ is number of voice QSTA contending in a superframe and $\lceil \cdot \rceil$ is a ceiling function: For data QSTAs, in case of contending with uplink voice QSTAs, the AIFS, denoted as $AIFS_{NRT}$, is given by $$AIFS_{NRT} = PIFS + CW_{min\_RT}. \quad (2)$$

The minimum and maximum contention window of data QSTA, $CW_{min\_NRT}$ and $CW_{max\_NRT}$, could be variable values set by QAP. Here, all the data QSTAs are with the same $CW_{min\_RT}$ and set to be $W_0$. Let M denote the maximum backoff stage and M be the value such that $CW_{max\_NRT} = 2^M \cdot W_0$.

Next, an analysis of performance will be provided.

Performance Analysis

In the analysis, real-time voice QSTAs, $N_V$ and non-real-time data QSTAs, $N_D$ are considered in the coverage of a QAP. An ideal channel condition without hidden terminals and with error-free transmission is also assumed. The mean duration of CAP in a superframe and mean contention time for a voice QSTA will be analyzed hereinafter. Using these two analytic results, the power consumption of a voice QSTA in the ODP scheme will also be directly derived in the following. Then, the frame transmission probability and aggregate throughput of data QSTAs will be analyzed as well.

A. Mean Duration of CAP

First, the analysis of the mean duration of CAP in a superframe will be described.

The four-state Brady model is assumed to be symmetrical in the sense that the statistical behaviors of downlink-only state and uplink-only state are the same. By balance equation, we can obtain the state probability of a single communication pair staying in mutual-silence state (state A), downlink-only state (state B), uplink-only state (state C), and double-talk state (state D), denoted by $p_a$, $p_b$, $p_c$, and $p_d$, respectively, which yields $$(\lambda_{ab} + \lambda_{ac})p_a = \lambda_{ba}p_b + \lambda_{ca}p_c, \quad (3)$$

$$(\lambda_{ba} + \lambda_{bd})p_b = \lambda_{ab}p_a + \lambda_{db}p_d, \quad (4)$$

$$(\lambda_{ca} + \lambda_{cd})p_c = \lambda_{dc}p_d + \lambda_{ac}p_a, \quad (5)$$

$$(\lambda_{db} + \lambda_{dc})p_d = \lambda_{bd}p_b + \lambda_{cd}p_c, \quad (6)$$

Given normalization condition for stationary probabilities, $$p_a + p_b + p_c + p_d = 1, \quad (7)$$

the state probabilities are expressed as $$p_a = \frac{\lambda_{ba} \cdot \lambda_{db}}{\lambda_{ba} \cdot \lambda_{db} + 2\lambda_{ab} \cdot \lambda_{db} + \lambda_{ab} \cdot \lambda_{bd}}, \quad (8)$$

$$p_b = p_c = \frac{\lambda_{ab} \cdot \lambda_{db}}{\lambda_{ba} \cdot \lambda_{db} + 2\lambda_{ab} \cdot \lambda_{db} + \lambda_{ab} \cdot \lambda_{bd}}, \quad (9)$$

$$p_d = \frac{\lambda_{ab} \cdot \lambda_{bd}}{\lambda_{ba} \cdot \lambda_{db} + 2\lambda_{ab} \cdot \lambda_{db} + \lambda_{ab} \cdot \lambda_{bd}}. \quad (10)$$

Since the process of each conversation pair is independent and identical, the probability of the integrated source of the conversation pairs staying in the four states, denoted by $N_a$, $N_b$, $N_c$, and $N_d$, respectively, can be obtained by using multinomial distribution $$P[(N_a, N_b, N_c, N_d)] = \frac{N_V!}{N_a!N_b!N_c!N_d!} p_a^{N_a} p_b^{N_b} p_c^{N_c} p_d^{N_d}, \quad (11)$$

where $N_a+N_b+N_c+N_d=N_V$. Also, the time durations for packet exchange in the four states, denoted by $T_a$, $T_b$, $T_c$, and $T_d$, are calculated by $$T_a = 0 \quad (12)$$

$$T_b = T_{PIFS} + \left(T_{PHY} + \frac{H_{MAC} + H_{UP} + R_S \cdot T_{SF}}{R_C}\right) \quad (13)$$

$$T_c = T_{SIFS} + \left(T_{PHY} + \frac{H_{MAC}}{R_C}\right) + T_b \quad (14)$$

$$T_d = T_{PIFS} + T_{SIFS} + 2\left(T_{PHY} + \frac{H_{MAC} + H_{UP} + R_S \cdot T_{SF}}{R_C}\right) \quad (15)$$

From (12) to (14), the system parameters are listed in Table 1. Denote $E[T_{CAP}]$ the mean duration of CAP in a superframe. By the properties of multinomial distribution, the mean duration of CAP is expressed by $$E[T_{CAP}] = \sum_{i \in (a,b,c,d)} E[N_i] \cdot T_i \quad (16)$$

$$= N_V \cdot \sum_{i \in (a,b,c,d)} p_i \cdot T_i.$$

B. Mean Contention Time of Voice QSTA

Now, the analysis of the mean contention time for a voice QSTA will be described.

During a contention period, due to the behavior of intermittent transmission, the mean number of contending voice QSTAs is smaller than 2 in this analysis. Thus, $CW_{min\_RT}=CW_{max\_RT}=2$. Firstly, we derive the successful contention probability during one contention period provided that there are Nc contending voice QSTAs, denoted by $P_s(N_C)$.

Denote $N_1$ as the number of contending QSTAs with counter set to 1, and $N_2$ as the number of contending QSTAs with counter set to 2. The successful contention event during a contention period is just either $\{N_1=1\}$ or $\{N_2=1\}$. Equivalently, it can be written by $$P_s(N_C) = P_r[\{N_1 = 1\} \cup \{N_2 = 1\} | N_1 + N_2 = N_C] \quad (17)$$

$$= P_r[N_1 = 1 | N_C] +$$

$$\sum_{\substack{k=0 \\ k \neq 1}}^{N_C} P_r[\{N_2 = 1\} | N_2 = N_C - k] \cdot P_r[N_1 = k | N_C],$$

where $= P_r[\{N_2 = 1\} | N_2 = N_C - k]$ $$= \begin{cases} 1, & k = N_C - 1 \\ 0, & \text{otherwise} \end{cases}.$$

For $N_C = 1$, $P_s(N_C) = 1$;

-continued for $N_C = 2$, $P_s(N_C) = 0.5$;

and for $N_C \geq 3$, $P_s(N_C) = N_C \cdot \left(\frac{1}{2}\right)^{N_C - 1}$.

Since successful contention in either time slot 1 or time slot 2 are also equally probable for $N_C \geq 3$ cases, the average time spent in one successful contention period is given by $$\overline{T}_S = \begin{cases} L_S + \frac{3}{2}\sigma & \text{for } N_C = 1 \\ 2L_S + 2\sigma & \text{for } N_C = 2 \\ L_S + \frac{3}{2}\sigma & \text{for } N_C \geq 3. \end{cases} \quad (18)$$

For the time spent in collision period given NC contention users, we enumerate all the situations how the collision happens as: $(N_1=N_C, N_2=0)$, $(N_1=0, N_2=N_C)$, and $(N_1 \geq 2, N_2 \geq 2, N_1+N_2=N_C)$. The first two events are equally probable and can be expressed by $$P_{1,coll} = P_r\{\text{all counters are set to 1} | \text{failure contention period}\} \quad (19)$$

$$= P_r\{N_1 = N_C | N_C, \text{failure}\}$$

$$= \frac{\left(\frac{1}{2}\right)^{N_C}}{(1 - P_s(N_C))}$$

or equivalently, $$= P_r\{N_2 = N_C | N_C, \text{failure}\} \quad (20)$$

$$= \frac{\left(\frac{1}{2}\right)^{N_C}}{(1 - P_s(N_C))}.$$

For $N_C \geq 2$, $$P_{2,coll} = P_r\{\text{collisions occur in both} | \text{failure contention period}\}$$

$$= P_r\{N_1 \geq 2 \cap N_2 \geq 2 | N_C, \text{failure}\}$$

$$= (1 - P_s(N_C) - 2P_{1,coll}(N_C))/(1 - P_s(N_C)).$$

The average time spent in one contention period that collision occurs is given by $$\overline{T}_C(N_C) = 2L_C + 2\sigma - \frac{\left(\frac{1}{2}\right)^{N_c}}{1 - P_s(N_C)}(2L_C + \sigma). \quad (21)$$

Define random variable $K_{N_C}$ as the number of contention periods such that first one of $N_C$ users successfully contends. We further define $T_{CT}$ as the random variable for the contention time. In general, the average contention time can be recursively given by $$E[T_{CT}|N_C] = \qquad (22)$$

$$\sum_{k=1}^{\infty} [(k-1)\overline{T}_C(N_C) + \overline{T}_S] \cdot P_r\{K_{N_c} = k\} + E[T_{CT}|(N_C - 1)] =$$

$$\overline{T}_S(N_C) + \overline{T}_C(N_C) \cdot \frac{1 - P_s(N_C)}{P_s(N_C)} + E[T_{CT}|(N_C - 1)].$$

Then, we can get the approximation form as follow $$E[T_{CT}|N_C] = E[T_{CT}|(N_C - 1)] + \overline{T}_C(N_C) \cdot \frac{1 - P_s(N_C)}{P_s(N_C)}, \text{ for } N_C \geq 3. \qquad (23)$$

Also, for $N_C = 1$, $E[T_{CT}|N_C = 1] = \frac{3}{2}\sigma + L_S$, and for $N_C = 2$, $$E[T_{CT}|N_C = 2] = 2L_S + L_C + \frac{7}{2}\sigma.$$

Finally, the mean duration of contention time, $E[T_{CT}]$, can be written as follow $$E[T_{CT}] = \sum_{(N_a+N_b)=0}^{N_V} \sum_{N_C=0}^{N_a+N_b} E[T_{CT}|N_C]P[N_C|N_a, N_b]P[N_a, N_b]. \qquad (24)$$

C. Power Consumption

Further, the power consumption of a voice QSTA in the ODP scheme can be derived as follows.

Here, the power consumption of a voice QSTA is defined as the ratio of power-on period over superframe duration. For the ODP scheme, the power consumption factor $\eta_{ODP}$ is equivalently expressed by $$\eta_{ODP} = \frac{E[T_{CAP}] + E[T_{CT}]}{N_V \cdot T_{SF}}. \qquad (25)$$

D. Aggregate Throughput of Data QSTA

Now the analysis of the frame transmission probability and the aggregate throughput of a data QSTA will be described below.

To calculate the aggregate throughput, the frame transmission probability, $\tau$, is obtained firstly. The frame transmission probability here is derived by two-dimensional Markov chain queuing model. After some derivations, the probability can be expressed by $$\tau = \frac{2 \cdot \sum_{i=0}^{M} P^i}{\sum_{i=0}^{M} P^i \cdot (2^i \cdot W_0 + 1)} \qquad (26)$$

$$= \frac{2(1 - 2P)}{\frac{W_0(1-P)(1-(2P)^{M+1})}{(1-P^{M+1})} + (1-2P)},$$

where P is the collision probability of data QSTAs. Then, we can derive the P based on its definition. P is the probability that a ready-to-transmit QSTA collides with any other QSTAs, which yields $$P = 1 - (1-\tau)^{N_D - 1}. \qquad (27)$$

Eq. (26) and (27) represent a nonlinear system in the two unknowns $\tau$ and P, which can be solved using numerical method.

Define $P_{idle}$ the probability that none of data QSTAs transmit in a randomly chosen time slot. $P_{idle}$ is given by $P_{idle} = (1-\tau)^{N_D}$. Also, denote $P_{one}$ the probability that only one data QSTA transmits in a randomly chosen time slot. $P_{one}$ is given by $P_{one} = N_D \tau (1-\tau)^{N_D-1}$. Then, the throughput of a single data QSTA, S', can be obtained by $$S' = \frac{E[\text{Payload Information in a slot time}]}{E[\text{Length of a slot time}]} \qquad (28)$$

$$= \frac{\tau(1-\tau)^{N_D-1} E[L_{PKT}]}{P_{idle} \cdot \sigma + P_{one} \cdot T_S + (1 - P_{idle} - P_{one}) T_C},$$

where $T_S$ ($T_C$) is the average time that channel is sensed busy because of a successful (collided) transmission, and $E[L_{PKT}]$ is the average frame length. Since the transmitted frames of data QSTAs cannot preempt those of voice QSTAs, the aggregate throughput of data QSTAs, denote as S, can be written as $$S = \left(\frac{T_{SF} - T_B - E[T_{CAP}] - E[T_{CT}]}{T_{SF}}\right) S', \qquad (29)$$

where $T_{SF}$ is maximum duration of the superframe, $T_B$ is the time to send a Beacon.

The parameters used for the following numerical analysis and simulations are summarized in Table 1, where the values of PHY-related parameters are referred to IEEE 802.11b (IEEE Std 802.11e/D3.0, "Wireless Medium Access Control (MAC) and Physical Layer (PHY) Specifications: Medium Access Control (MAC) Enhancements for Quality of Service (QoS)", May 2002). Unless otherwise specified, a constant frame payload size of 1028 bytes, which includes 1000 bytes application data payload, 20 bytes IP header, and 8 bytes UDP header, is used in the simulations. The maximum backoff stage M was set to be equal to 5. The power consumption of voice QSTAs and the aggregate throughput for data QSTAs are investigated by using the proposed ODP scheme, a round robin mechanism with Brady's model (RR-Brady) and a round robin mechanism with constant bit rate (RR-CBR) ("Voice and Data Transmission over an 802.11 Wireless Network", M. A. Visser and M. E. Zarki, IEEE PIMRC, September 1995), respectively. The coding rate of CBR source model is 8 Kbps. Since the voice QSTAs will not contend in CP within RR-Brady and RR-CBR schemes, $AIFS_{NRT}$ is set to be DIFS.

TABLE 1

| Parameter | Symbol | Value |
|---|---|---|
| Duration of the superframe | $T_{SF}$ | 20 ms |
| Voice coding rate in bps | $R_S$ | 8 K |
| Transmission rate in bit/sec | $R_C$ | 11 M |
| MAC header (QoS data type) in bits | $H_{MAC}$ | 30 * 8 |

TABLE 1-continued

| Parameter | Symbol | Value |
| --- | --- | --- |
| Header overheads (IP + UDP + RTP) in bits | $H_{UP}$ | 40 * 8 |
| Physical overhead in sec (including preamble length and header length) | $T_{PHY}$ | 192 μs |
| Beacon size in bit | B | 40 * 8 |
| SIFS | $T_{SIFS}$ | 10 μs |
| PIFS | $T_{PIFS}$ | 30 μs |
| Slot time | σ | 20 μs |
| Time to send a beacon | $T_B$ | Computed |
| Time to successful transmit a contention packet | $L_S$ | Computed |
| Time to transmit a collided packet | $L_C$ | Computed |
| Time to send an ACK frame (14 bytes) | $T_{ACK}$ | Computed |

Figure 2:
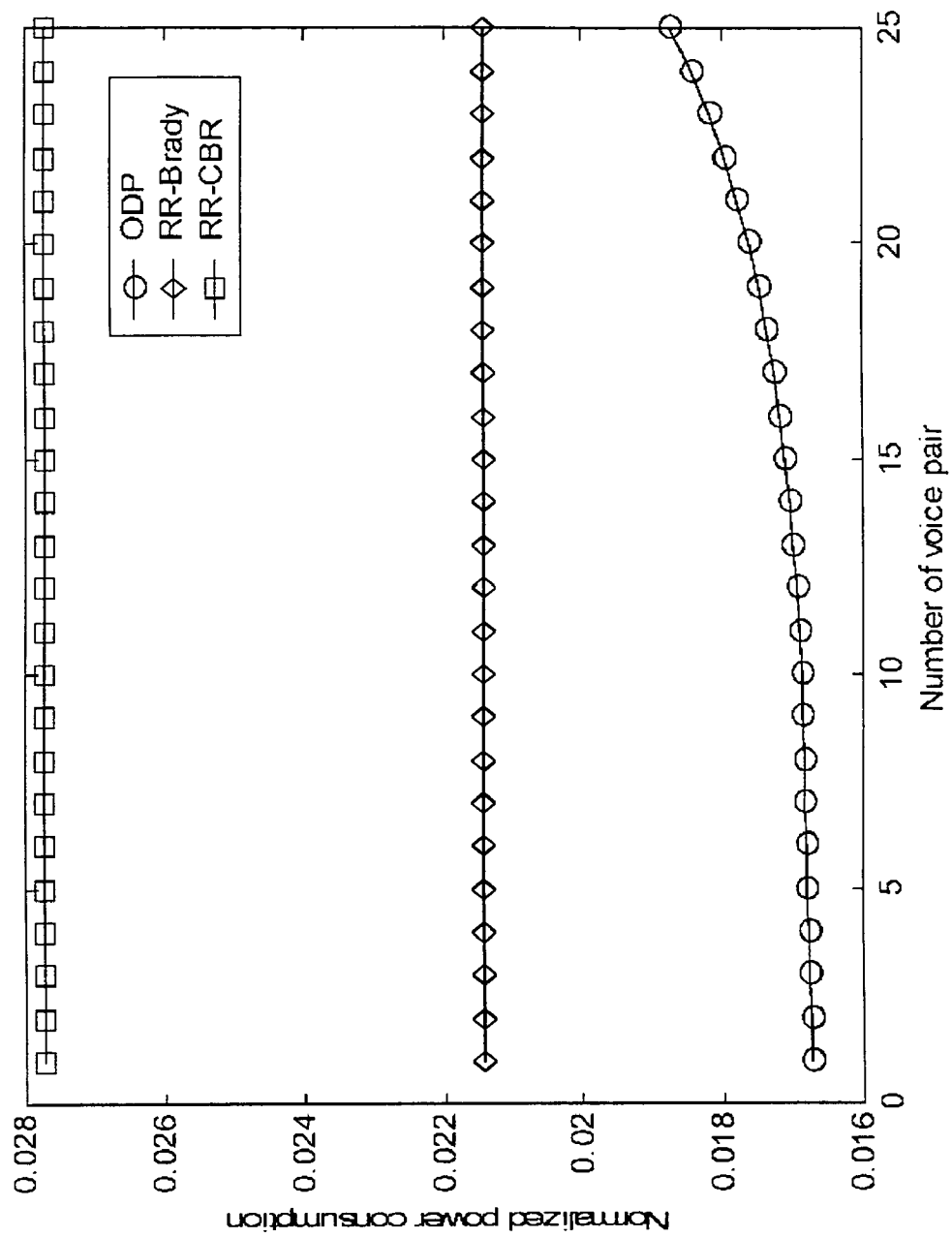
FIG. 2 is a diagram that shows the normalized power consumption for a voice QSTA according to the present invention.

FIG. 2 shows the normalized power consumption versus the number of voice pairs. The normalized power consumption is defined as the percentage of a voice QSTA operating in active mode within a superframe. From the figure, it can be found that the power consumption of ODP scheme increases with the number of voice pairs, which is resulted from the increased mean contention time. However, the ODP scheme consumes the least power while the RRCBR consumes the most. In the ODP scheme the voice QSTA will be removed from the polling list when there is no packet to transmit. It is beneficial to reduce the power consumption. When the number of voice pair is 25, the ODP scheme outperforms the RR-Brady and RR-CBR schemes by an amount of 12.5% and 32.4%, respectively.

Figure 3:
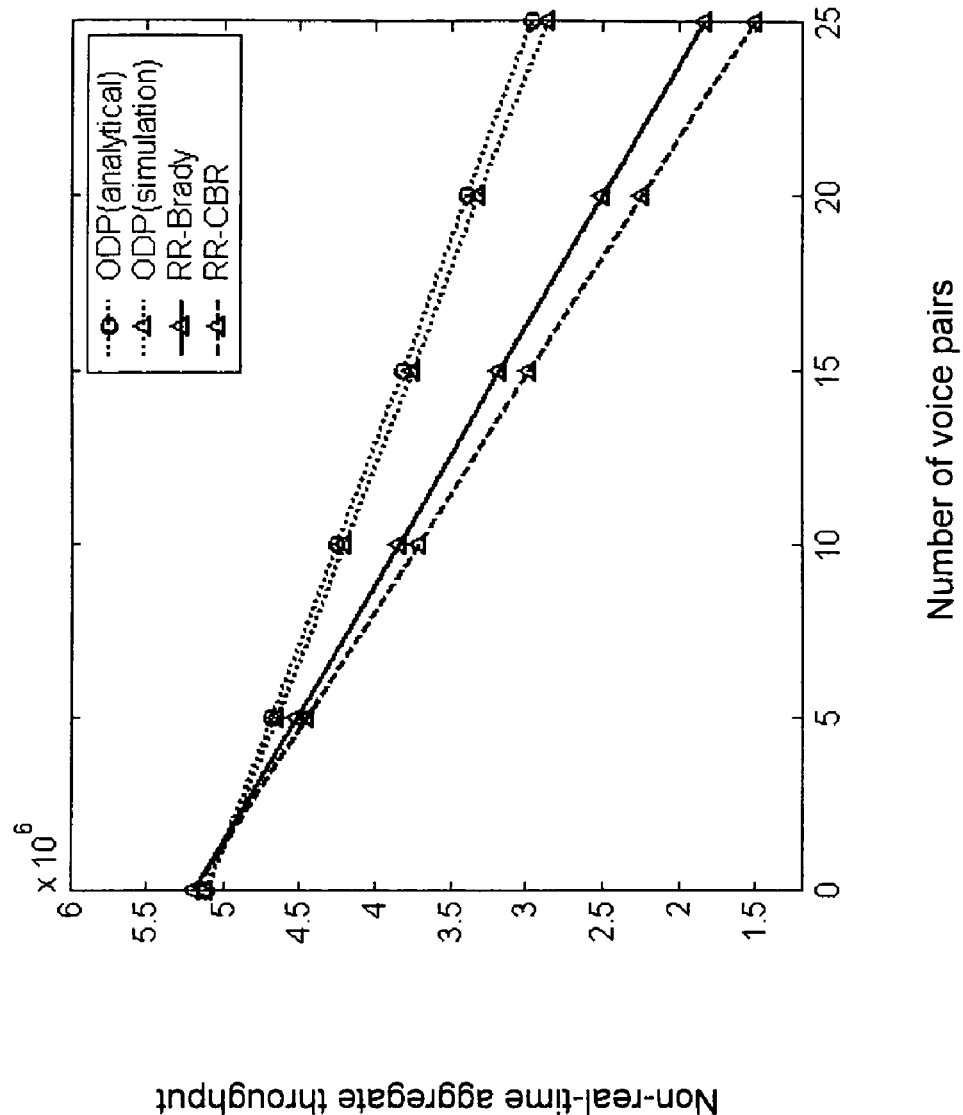
FIG. 3 is a diagram that shows the aggregate throughput for a data QSTA according to the present invention.

FIG. 3 shows the aggregate throughput of data QSTAs versus the number of voice pairs. The number of data QSTA is 15 and the minimum contention window is 32. The number of voice QSTAs is ranging from 0 to 25. The curves of simulation results and numerical results of ODP are very close, which justifies the accuracy of our analysis. Also, comparing the three schemes, it can be found that the aggregate throughput of ODP scheme is the highest among the three schemes. The throughput enhancement increases as the number of voice QSTAs increases. When the number of voice QSTAs is 25, the ODP scheme outperforms the RRCBR (RR-Brady) scheme by an amount of 90.6% (56%). The aggregate throughput of ODP scheme is smaller than that of RR-Brady and RR-CBR schemes for the cases that accommodated voice pairs is smaller than two. The reason is that the $AIFS_{NRT}$ of RR-Brady and RR-CBR schemes is smaller than that of ODP, which contributes to a higher aggregate throughput.

To conclude, a power-efficient MAC protocol, named ODP, for WLAN supporting integrated voice and data service is proposed. In the ODP scheme, the voice QSTAs are polled by the QAP at the CAP while the data QSTAs contend for transmission at the CP. When a voice QSTA is back from silence mode, it uses EDCF to request for including itself to the polling list. Simulation results show the accuracy of our analysis and the performance of the ODP scheme. It is found that the ODP scheme consumes less power and achieves higher data throughput compared with the RR/Brady and RR/CBR schemes.

Although the present invention is described with respect to the particular embodiment, it will be apparent to those skilled in the art that various changes and modification may be made without departing from the spirit and scope of the invention as defined in the following claims.

What is claimed is:

1. A method for power-efficient transmission supporting integrated service over WLAN (wireless local area network), which comprises:

using an on-demand polling (ODP) scheme, which combines polling-based and contention-based mechanism and dynamically adjusts a polling list, wherein voice services are transmitted by the polling-based mechanism and data services are transmitted by the contention-based mechanism, wherein a voice station is in the polling list when it is in the active mode;

the voice station is temporarily removed from the polling list when it is silent and configured to operate in the sleep mode without uplink transmission for saving power during an idle mode; and the voice station adopts the contention-based mechanism to join the list again while returning from the idle mode, wherein in the ODP scheme, a superframe of WLAN is divided into controlled access phase (CAP) and contention phase (CP), in which the voice services are transmitted at CAP and the data services are transmitted at CP, wherein after the CAP, the remaining time of the superframe is allocated for the CP, and wherein the CAP within the superframe is divided into bi-direction voice transmission, uplink-only voice transmission (UL-only) and downlink-only voice transmission (DL-only), and an access point (AP) periodically sends polling grants in the CAP within the superframe for conducting.

2. The method according to claim 1, wherein differentiated transmission priority is adopted to transmit voice and data packets over WLAN, wherein the voice packets are sent by the higher priority.

3. The method according to claim 1, wherein a QAP (QoS Access Point) adds a voice station into the polling list after accepting a new voice call;

the QAP then periodically polls the voice stations according to the list and waits for transmission of uplink voice packets;

a voice station entering the silence period is removed from the polling list; and while initiating a talkspurt, a voice station uses higher access priority to send voice packets for joining the polling list.

4. The method according to claim 3, wherein during bi-directional voice transmission and uplink-only voice transmission periods, a voice station is regarded as entering the silence period and removed from the polling list if two consecutive QoS Null frames are received by the QAP.

5. The method according to claim 1, wherein QAP should assign different AIFS, minimum contention window size, and maximum contention window size for voice and data stations.

6. The method according to claim 5, wherein for the guarantee of access delay, the AIFS of a voice station, denoted as $AIFS_{RT}$, is set to be PIFS and expressed by $AIFS_{RT}$=PIFS.

7. The method according to claim 5, wherein for the guarantee of access delay, the minimum contention window size for voice stations, denoted as $CW_{min\_RT}$, and the maximum contention window size for voice stations, denoted as $CW_{max\_RT}$, are given by $CW_{min\_RT}=CW_{max\_RT}=\max(2, \lceil E[N_V]+1 \rceil)$, where $N_V$ is number of the voice stations contending in a superframe and $\lceil \cdot \rceil$ is a ceiling function.

8. The method according to claim 5, wherein for the guarantee of access delay, the AIFS for data stations, denoted as $AIFS_{NRT}$, is given by $AIFS_{NRT}=PIFS+CW_{min\_RT}$.

* * * * *

UNITED STATES PATENT AND TRADEMARK OFFICE
CERTIFICATE OF CORRECTION

PATENT NO. : 7,653,041 B2
APPLICATION NO. : 11/128794
DATED : January 26, 2010
INVENTOR(S) : Shih et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Twenty-third Day of November, 2010

David J. Kappos
*Director of the United States Patent and Trademark Office*